June 9, 1936. T. R. CAMP 2,043,734
WATER FILTRATION APPARATUS
Filed Dec. 30, 1933 2 Sheets-Sheet 1

WITNESSES
Franklin E. Johnson
Edward H. Goodrich

Inventor
THOMAS R. CAMP
By Clayton L. Jenks
Attorney

June 9, 1936.  T. R. CAMP  2,043,734

WATER FILTRATION APPARATUS

Filed Dec. 30, 1933  2 Sheets-Sheet 2

WITNESSES
Franklin E. Johnson
Edward H. Goodrich

Inventor
THOMAS R. CAMP
By Clayton L. Jenks
Attorney

Patented June 9, 1936

2,043,734

UNITED STATES PATENT OFFICE

2,043,734

WATER FILTRATION APPARATUS

Thomas R. Camp, Newton, Mass., assignor to Norton Company, Worcester, Mass., a corporation of Massachusetts Application December 30, 1933, Serial No. 704,707

4 Claims. (Cl. 210—130)

This invention relates to a self-cleaning filtration installation especially adapted for the treatment and purification of drinking water or other liquids, such as sewage.

Heretofore, it has been common practice in water purification systems to employ filtration tanks provided with perforated pipes or strainers passing through a suitable impervious support which has several superimposed, carefully graded layers of gravel thereon, each of which is of a finer grade than its supporting layer, said gravel being finally covered by a relatively deep layer of sand. The sand serves as the filtering medium and removes all dirt and solid particles from the water which seeps therethrough and down through the gravel and then out through the perforations in the spaced pipes or strainers into a suitable reservoir located in the bottom of the tank.

Due to the fact that sand filters of this type frequently become clogged, it has been the practice to occasionally cut off the flow of unfiltered water into the filter chamber and provide a reverse flow of clean water up through the perforated pipes, gravel and sand in an attempt to dislodge dirt and sediment from the sand filter bed and flow it off from the filtering chamber through suitable drainage ducts. This method of backwashing of the filter bed to clean the sand has not proved entirely satisfactory, since it has been found that a water velocity of sufficient magnitude to adequately agitate the layer of filtering sand and separate the sediment therefrom often disturbed and intermixed the various carefully graded layers of gravel and sand to such an extent as to require a complete removal and rebuilding of the graded filter bed. On the other hand, if the top layer of filtering sand were not sufficiently agitated by the reversed flow of wash water through the filter, the water would tend to bore up through the sand unevenly in various places and the heavy, clotted masses of conglomerate sediment and sand would not be properly separated, but would tend to settle down into the gravel bed and spoil the operation of the filter, thus necessitating a complete removal and rebuilding of a newly graded filter bed. If the filter bed were not rebuilt at this time, a further filtering operation would tend to wash the sediment through the pipes into the reservoir and thus contaminate the water which had already been filtered.

Various other schemes have been proposed for filtering water on a large scale, and which have involved the use of filtering devices of many types; but none of these has involved adequate provision for cleansing the filtering medium and maintaining it in a proper condition for continued use. It has been found that sand constitutes an ideal filtering medium, although the problems involved in cleaning the sand without removing it from the filter bed have been difficult of solution; hence it is highly desirable to provide a filter construction in which loose sand is the filtering medium.

The major object of the present invention is, therefore, to provide a filter plant construction of such a type that loose, granular material, such as sand, may be efficiently employed as the filtering medium and be readily and thoroughly cleaned without removal from the filter chamber, and which may be used without requiring the presence of lower supporting layers of gravel or other objectionable constructional features.

Another object of this invention is to provide a porous bottom for a filter bed made up of a plurality of individually removable permeable members which are equally pervious and tend to provide an even flow of liquid throughout the entire porous bottom.

A further object of this invention is to provide a self-cleaning filtration device of such construction that cleaning water may be flowed through a porous support for a granular filter bed under a substantially equalized pressure throughout the entire support and so cause an even agitation of the entire filter bed and wash it free of all sediment deposited therein during filtration.

With these and other objects in view, as will be apparent to one skilled in the art, this invention resides in the combination of parts herein disclosed and covered by the appended claims.

In the accompanying drawings illustrating this invention, wherein like reference numerals indicate like parts:

Figures 1, 3:
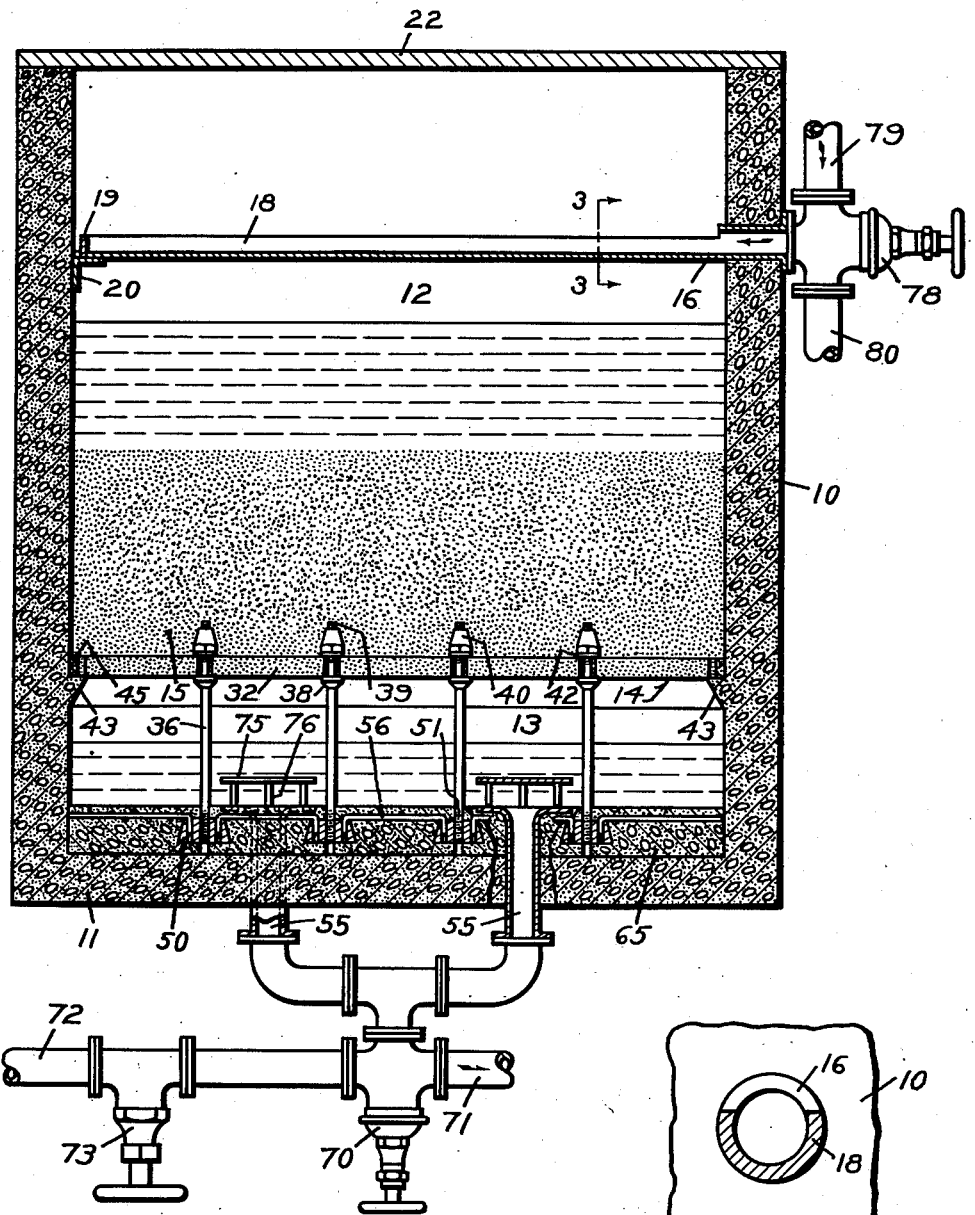
Fig. 1 is a sectional view showing the preferred embodiment of this invention.
Fig. 3 is a sectional view taken along line 3—3 of Fig. 1.

According to this invention, there has been provided an improved type of rapid filtering device especially adapted for a large scale treatment of water, but capable of separating solid materials from various other liquids to clarify them. This filtering device consists essentially of a bed or layer of loose, finely divided, granular filtering material, and preferably sand, directly supported on a porous false bottom, and preferably a tile partition of fine pores and substantially even permeability throughout its entire body, such as a set of tiles or plates made of bonded granular material of required permeability, whereby solid materials may be caught by the sand and the liquid may readily escape through the sand and the porous support. When the granular filtering material becomes clogged and impervious to the flow of liquid therethrough due to sediment separated out during filtration, water may be forced back through all portions of the porous partition under a uniformly distributed pressure to evenly agitate all portions of the sand or other granular filtering materials employed and cause the adjacent grains to abrade each other and separate the sediment therefrom. Since this sediment is lighter than the granular particles forming the filter bed, it will be washed therefrom and flowed off through suitable ducts. Upon completion of the washing operation, the cleaned granular filtering material will quickly settle down upon the permeable tile partition in a position to again perform a rapid and efficient filtering operation. It is essential, however, that the washing operation act evenly and uniformly agitate all portions of the granular filtering material simultaneously, so that the heavy portions of solid sedimentary material cannot sink to the bottom of the filter bed, but will necessarily be broken up into small particles which rise above the filtering material and are washed from the filter chamber.

For the purposes of illustration, I have shown and described my invention with relation to a water filtration system, but it will be apparent that this invention is applicable for use with various fluids, such as sewage; and I, therefore, do not wish to limit this invention solely to the treatment of drinking water. It will further be appreciated that while this invention as shown is specifically adapted for use as a conventional type of rapid sand filter for the purification and clarification of water, it may also be employed in connection with various water softening devices, wherein it is particularly advantageous to frequently subject the filtration or treatment bed to a rapid and efficient washing operation. For example, the granular filtering material may comprise a zeolite sand which serves as a water softening material instead of a quartz sand which is commonly utilized as a filtration medium. In like manner, my invention may also be used with beds of granular activated carbon or beds of other suitable granular contact media.

In the preferred embodiments of my invention, as illustrated in the accompanying drawings, one form of my invention comprises a large scale water treatment plant wherein a tank 10 of suitable size, shape and material is provided and which in the present instance for convenience of illustration is shown as a small unit, but which in actual use may be many feet in length and breadth. The unit may comprise a rectangular concrete tank having a substantially flat bottom 11, and which is divided into a filter chamber 12 and a reservoir 13 separated by a substantially horizontal partition or false bottom 14. This bottom comprises porous tiles or plates which are uniformly permeable throughout the entire bottom. These plates are arranged to support a filter bed composed of a layer of relatively fine, granular material 15, such as a quartz sand, which is pervious to the flow of fluids to be filtered and clarified, but which will prevent any flow of solid particles therethrough.

The fluid to be treated, such as raw water, may be entered or withdrawn from the filtering chamber in any convenient manner, but I preferably employ a pipe 16 which extends substantially horizontally across the upper portion of the tank, as shown, and which is provided with a gutter portion 18 arranged to evenly distribute any flow of fluid entering through said pipe over the entire top surface of the sand filter 15. The gutter 18 terminates in a baffle 19 and is supported adjacent to said baffle in any suitable manner, as by a bracket 20 secured to the side of tank 10. It will be appreciated that one or more of said pipes provided with gutter portions may be used and their number is dependent upon the size of the filter chamber. It is essential, however, that a sufficient number of gutters be employed and so located that the inflow of fluid to be filtered or treated in chamber 12 will be substantially uniformly distributed over the entire top surface of the filter bed 15. If desired, the top of tank 10 may be provided with a suitable tight fitting cover 22 which prevents dirt and other contaminating materials from falling into the filter chamber and permits pressure filtration, if desired.

The false bottom 14, as illustrated, preferably comprises a plurality of adjacent, abutting porous plates 32 which are evenly permeable throughout all portions of their structures and cooperate to provide a horizontal partition which may pass a substantially given amount of fluid through every unit area of the partition surface supporting the filter bed during a given time. In other words, the plates 32 are so constructed and so positioned that they will aid in maintaining a uniform rate of filtration simultaneously throughout all portions of the granular filter bed, thereby tending to prevent any particular portion of the filter bed from clogging more rapidly than other portions of the filter bed. By maintaining such uniform filtration throughout the entire filter bed, there is less tendency for the bed to clog and necessity for cleaning the filtering medium 15 occurs less frequently. It will be appreciated that the permeability of the porous plates 32 is preferably greater than that of the sand filter bed, so that they will not impede the rate of filtration, yet their pores are sufficiently small to prevent the grains of filtering sand from entering the plates and retarding the fluid flow therethrough.

The preferred type of porous plate is made by bonding granular material as a porous tile. The granular material may be quartz sand but preferably crystalline alumina or silicon carbide granules of a required size which are suitably bonded into an integral porous body by a ceramic or silicate bond or other suitable cementitious medium. The preferred type of plate is made of crystalline alumina grains of suitable sizes bonded by a vitrified ceramic bond made up of raw clay and other ceramic materials fired in intimate association with the grains under a heat treatment which serves to vitrify the bond. This tile or plate may be made, for example, in accordance with the procedure set forth in the patent to Washburn No. 1,681,890 of August 21, 1928. Its porosity may be predetermined by suitable methods, such as by a proper control of the sizes of the alumina grains and the volume percentages of the grains, bonds and pores. The pores are small and of such sizes as to support the sand particles without becoming clogged thereby. In particular, I prefer to employ an "Alundum" porous plate found on the market, which is made of ceramic bonded crystalline alumina grains. However, various other types of porous media may be employed within the scope of this invention, provided they have the required uniformity of pore structure and sufficient permeability for the purpose of transmitting the water during both the filtering and the washing operations. For example, sand or other granular material may be bonded into plates by cements of various types, which may be set by heat or which harden when cold, provided they are insoluble and non-reactive in the water being filtered.

Figure 2:
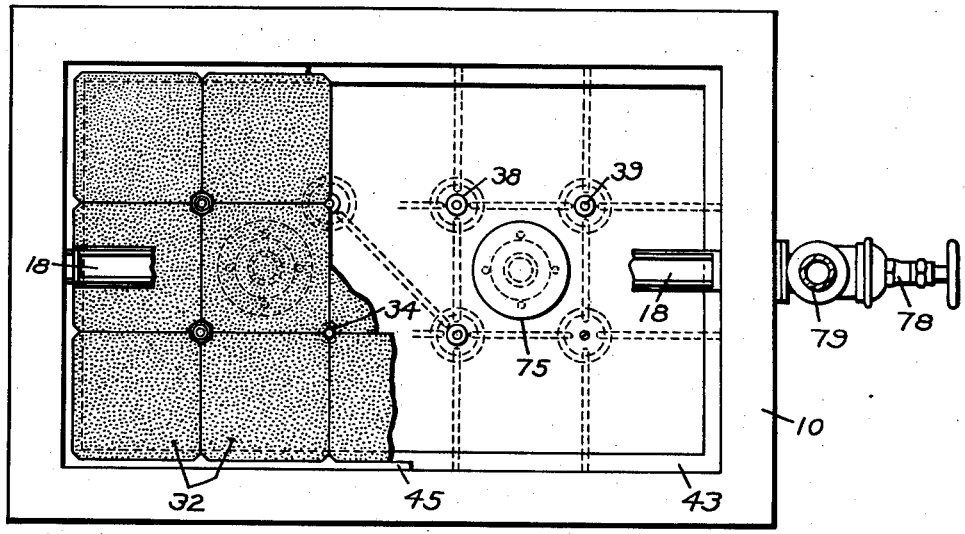
Fig. 2 is a plan view partly broken away to show various constructional details of this invention.

Various devices may be employed to support the porous plates and form the permeable partition 14, but I preferably employ supporting devices arranged to removably support a set of rectangular porous plates in tessellated formation without materially impeding the flow of liquid therethrough. In order to accomplish this, I preferably employ plates 32 which are of the same shape, size, and permeability, whereby they may be interchangeably mounted as desired. A small portion of each corner of each plate is cut off in any suitable manner so that when four of the plates are mounted together in tessellated formation, said cut portions cooperate to form a hole 34 at the junction point of the four plates of sufficient size to permit a supporting rod 36 to pass therethrough. This hole may, of course, be located other than at the corners of the plates. Each rod 36 is provided with a flanged portion 38 near its upper end and arranged to extend beyond the edges of hole 34 and support the adjacent corners of four porous plates, as shown in Figs. 1 and 2. The upper end of rods 36 are provided with threaded portions 39 arranged to receive clamping nuts 40 and washers 42 whereby the corners of each set of four adjacent porous plates may be simultaneously and removably clamped in position. The porous plates 32 which are adjacent to the walls of the tank may also be supported by a short lip or shelf 43 extending around the tank sides as shown. The interstices between the sides of the tank and the porous plates adjacent thereto may be filled with any suitable cementitious material 45 to prevent leakage of filtration sand therebetween. The nuts 40 are preferably conical or acorn shaped, as shown, so that the filter sand cannot pack thereon and impede the filtering operation.

The rods 36 may be secured to the bottom of the tank in any suitable manner whereby the partition 14 will be securely maintained in position, but I preferably utilize a plurality of anchoring cones 50 imbedded within the bottom of the tank and having threaded portions engageable with threaded portions 51 on the bottom of each rod. It will be appreciated that the size of the porous plates 32 must be so chosen that neither said rods nor their anchoring cones will interfere with the location of ducts 55 entering through the bottom of the tank and providing communication for filtered water to enter or be withdrawn from reservoir 13.

Figure 6:
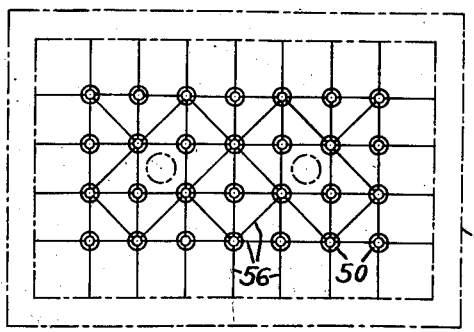
Figs. 5 and 6 show one method of locating the anchoring devices relative to each other.
Figure 5:
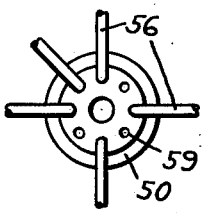

In order to permanently locate the anchoring cones 50 in final position, said cones are placed on the bottom 11 of the tank and interconnected by preshaped wire lugs 56 which have depending portions 57 at each end adapted to tightly engage holes 59 in the cones, thereby positively aligning said cones in position for correct location of rods 36, as shown in Figs. 1, 5, and 6. During construction, each of these cones may have its threaded portion engaged by a bolt 61 to locate the cones at a desired height above the tank floor. After all of the cones have been correctly located, a cementitious material 65, such as concrete, is flowed into the bottom of the tank to permanently imbed the cones and lugs. When the cement has set, the bolts 61 may be removed from the anchoring cones and replaced with the rods 36 which are screwed therein until the flange portions 38 are at a correct height to evenly support the plates 32 and form the false bottom 14.

One important feature of my invention provides a construction wherein the filtered water may be forced back up through the permeable tile bottom 14 under an evenly distributed pressure to lift and uniformly agitate the sand particles and simultaneously upset all portions of the granular filter bed 15, whereby the sediment collected therein from filtration will be broken up and washed upward and above the sand and thus be separated therefrom and carried out through the gutters 18, leaving a thoroughly cleaned filter bed. To accomplish this, the supporting rods 36, flanges 38, nuts 40 and washers 42 have such a small cross-sectional area as compared with that of the entire false bottom 14 supporting the filter bed, as to be negligible and make the false bottom virtually available in its entirety as a uniformly permeable partition for even distribution of washing fluid therethrough. The false bottom is supported at such a height above the floor of reservoir 13 that, when back washing with filtered water the differences in pressure between the various points under the false bottom will be negligible as compared with the loss in pressure through the porous plates.

The ducts 55 are connected through suitable piping to a two-way valve 70 whereby filtered water from reservoir 13 may be withdrawn through a pipe 71, or cleaned water from a suitable source may be entered under pressure through a pipe 72 to flow back into reservoir 13 and up through the false bottom to perform a washing operation. The pressure and volume of wash water flowing into reservoir 13 may be controlled by a valve 73. The ducts 55 preferably enter the bottom of reservoir 13 flush with its floor and suitable baffles 75 are secured as by studs 76 above the ends of said ducts and substantially parallel to the floor of the reservoir, whereby all flow of wash water will be directed laterally into the reservoir and aid in maintaining evenly distributed backwash pressures per unit of area of the underside of the porous plates. It will, of course, be appreciated that the reservoir 13 may be supplied with as many ducts 55 as required, and these ducts are so located as to provide a substantially even distribution of wash water into the reservoir.

Wash water entering through pipe 72 and control valve 73 may be supplied from any suitable source of cleaned water, but it is essential that it must be supplied to the reservoir under such a pressure and at such a rate that the lateral flow of water into the bottom of reservoir 13 under the porous plates is at such a relatively low velocity that the variation of pressure head against the underside of said porous plates is negligible as compared with the loss of head through the porous plates. Hence, wash water will be caused to flow evenly through the false bottom 14 and uniformly agitate and wash all portions of the sand filter bed, simultaneously causing the sand particles to violently engage each other and break up the sediment which is then washed above the filter bed and out through gutter 18 and pipe 16. Pipe 16 is connected to a two-way valve 78 which is opened to a feed pipe 79 during the filtering operation to enter raw water into chamber 12 and to a suitable drain pipe 80 during the washing operation to flow off the sediment and impurities from the filter bed.

Figure 7:
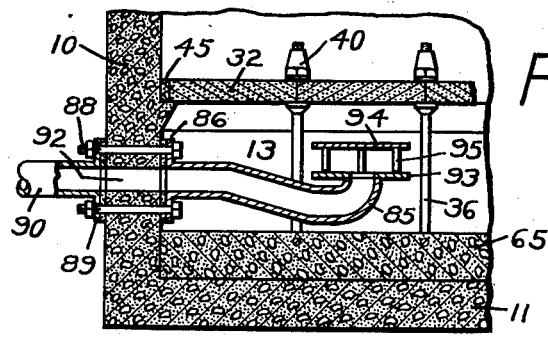
Fig. 7 shows a modified form of this invention.
Figure 4:
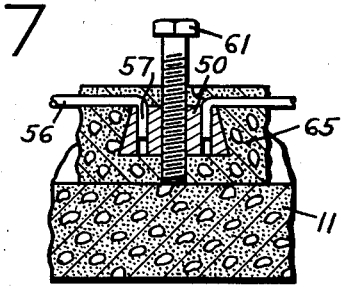
Fig. 4 shows an anchoring device embedded within the floor of a filter tank.

My invention may also be adapted as a convenient and inexpensive means to rebuild various old types of filter systems into highly efficient, self-cleaning, rapid acting filtration devices, or it may be applied to any type of filter tank wherein it is impractical to enter ducts through the tank bottom due to installation difficulties. As illustrated in Fig. 7, a modified type of my invention adapted to the above uses provides one or more manifolds 85 as required and secured wherever desired to the inside face of a filter tank near the bottom of said tank and adapted to serve the same purposes as ducts 55, as shown in my preferred construction. The false bottom 14 which separates the filtration chamber from the reservoir may be composed of porous plates 32 identical with those shown in my preferred construction and supported in the same manner. The manifold 85 may be secured to the side faces of the tank in any suitable manner as by flanges 86 arranged to receive clamping bolts 88 which pass through holes in the tank and a flange 89 on the end of pipe 90, thereby securing said manifold and pipe together in communication with each other and in alignment with a hole 92 through the side of the tank. Suitable gaskets are also held in engagement between the respective flanges and the side faces of the tank to prevent leakage of fluid therebetween. The inner end of each manifold is provided with two substantially horizontal and flanged portions 93 and 94 which are secured in position by a plurality of studs 95 whereby any clean water flowing into the reservoir 13 to perform a washing operation will be caused to flow laterally into the reservoir as in my preferred construction.

In the operation of my filtering device, valve 78 is positioned so that raw water may flow into the filtering chamber through pipe 16, and valve 70 is so positioned that filtered water may be drawn from the reservoir. When these valves are so positioned, raw water flows through pipe 79, valve 78, pipe 16, and is distributed into the filter chamber 12 over the top of the sand filter bed 15 from gutter 18. The filter bed separates all particles of solid matter from the water, but is sufficiently permeable to permit the water to flow therethrough. The filtered water then flows from the sand bed down through the porous plates 32 and into reservoir 13, from which it is drawn off through ducts 55 and valves 70 into the drain 71 which may connect with any suitable supply system.

Due to the separation of solid matter from the raw water during filtration, the filter bed 15 gradually becomes clogged with sediment and the rate of filtration is impeded. Whenever the operator desires, he may quickly clean the filtering sand and the filter chamber to again bring the filter back to its original efficiency. To accomplish this, valve 78 is operated to cause outlet pipe 80 to communicate with the filter chamber, and valve 70 is operated to cause pipe 72 to communicate with the reservoir 13. When the valves are in these respective positions, clean water may be entered through pipe 72 under a suitable pressure as controlled by valve 73 and flow through valve 70 and out through ducts 55 from whence it is directed laterally into the bottom of reservoir 13. Owing to the relatively low velocity of the back flow of water into the reservoir, said water will be forced up through the porous plates 32 under a uniformly distributed pressure over their entire area and serve to evenly and simultaneously agitate and wash all portions of the sand filter bed, thereby causing the adjacent granular sand particles to move about and abrade each other and break up the sediment which, due to the upward flow of the water, is washed out through gutter 18, pipe 16, valve 78 and outlet pipe 80, thereby leaving the filter bed and filtering medium in a clean condition. When valve 70 is again positioned to drain filtered water from reservoir 13, the sand filter bed 15 will quickly settle on the porous plates in position to again perform an efficient filtering operation. After the filter bed has settled, valve 78 may be again positioned to admit raw water through pipe 79 into the filter chamber for further filtration thereof.

Having thus described my invention, what I claim as new and desire to secure by Letters Patent is:

1. A water filtration apparatus comprising a tank, a horizontal porous partition therein spaced from the tank bottom and arranged to form an upper water chamber and a lower filtrate chamber, said partition comprising a plurality of uniformly permeable porous plates of bonded granular material capable of supporting the filtering grains thereon and being so constructed and arranged that it provides a substantially uniformly distributed flow of water throughout its effective surface area, a gravity filtering bed of loose, finely divided filtering grains supported by the plates and constituting the sole filtering medium, means for removably supporting the individual plates which does not materially affect the uniformity of water distribution therethrough and which provides a substantially uninterrupted clear space adjacent to the undersides of the plates, means for introducing raw water to the upper chamber, means for conducting the filtrate from the lower chamber, means for distributing wash water uniformly to the under sides of the plates and causing it to lift and wash all of the filtering grains thereabove and means for collecting and removing the wash water and sediment from the upper chamber.

2. An apparatus of the type covered by claim 1 in which the porous plates comprise granular material bonded together by a vitrified ceramic bond and have a substantially uniform thickness and permeability throughout.

3. An apparatus of the type covered by claim 1 in which the porous partition is made of a plurality of relatively thin plates of uniform thickness and permeability, and the plate supporting means comprises members mounted on the tank which engage only small areas of the plates and do not materially hinder the distribution of water therethrough, whereby all of the granular material will be lifted and agitated during the back washing operation.

4. An apparatus of the type covered by claim 1 in which the plates are composed of ceramic bonded granular material arranged to form the entire effective area of the partition, and the plate supporting means comprises adjustable members which engage only small areas of the plates and permit individual removability thereof.

THOMAS R. CAMP.